United States Patent [19]
Davis

[11] 4,359,146
[45] Nov. 16, 1982

[54] ROTATION SENSING CONTROL

[75] Inventor: Gordon J. Davis, Newton, Iowa

[73] Assignee: The Maytag Company, Newton, Iowa

[21] Appl. No.: 216,450

[22] Filed: Dec. 15, 1980

[51] Int. Cl.³ .......................... F16P 3/08; B04B 7/06; F16D 35/00

[52] U.S. Cl. .................................. 192/136; 68/23 R; 192/58 B; 210/146

[58] Field of Search ............. 192/58 B, 136; 68/23 R; 210/146

[56] References Cited

U.S. PATENT DOCUMENTS

| | | | |
|---|---|---|---|
| 1,001,065 | 8/1911 | Mursch | 192/58 B |
| 2,824,649 | 2/1958 | Smith | 210/146 X |
| 2,843,239 | 7/1958 | Nelson | 192/136 |
| 3,209,874 | 10/1965 | Foster et al. | 192/58 A |
| 3,575,269 | 4/1971 | Sherman | 192/58 R |
| 3,734,290 | 5/1973 | Nelson | 210/146 |
| 3,762,552 | 10/1973 | Landwier | 210/146 |

FOREIGN PATENT DOCUMENTS

| | | | |
|---|---|---|---|
| 246563 | 3/1909 | Fed. Rep. of Germany | 210/146 |
| 1086204 | 8/1960 | Fed. Rep. of Germany | 68/23 R |

*Primary Examiner*—Allan D. Herrmann
*Attorney, Agent, or Firm*—Richard L. Ward

[57] ABSTRACT

A rotation sensing control is provided for an appliance having a rotatable member. A rotation sensing mechanism is coupled to the rotatable member and includes a fluid shear coupling. This coupling is operable for rotating through a predetermined arcuate distance during movement of the rotatable member. The coupling movement is transferred to a movement control mechanism through appropriate linkage to maintain a movable member in a predetermined posture whenever the rotatable member is operated.

22 Claims, 7 Drawing Figures

ROTATION SENSING CONTROL

BACKGROUND OF THE INVENTION

This invention relates generally to the field of rotatable appliances and more particularly to a rotation sensing control operable for maintaining a movable member in a predetermined posture during periods of high speed spin operation.

Throughout the history of rotatable appliances there has been an ongoing search for improved and more economical methods to control the movement of certain members during periods of high speed spin. One commonly used method of control has been the use of a latching member movable by a solenoid which is energized and deenergized at predetermined times by a timer mechanism.

Another commonly used method of control has been the use of a disposable plunger which is engageable with a rotatable member and which is mechanically connected to actuate a latch such as shown in U.S. Pat. Nos. 3,734,290 and 3,762,552.

Several other prior control systems including U.S. Pat. No. 2,843,239 directly sense rotation of the drive motor and, when rotation is sensed, either actuate a solenoid or a centrifugal device to latch a movable member in a predetermined posture.

Various fluidically coupled devices such as U.S. Pat. Nos. 1,001,065; 3,209,874 and 3,575,269 have been shown in prior art for actuating engine governors, speed indicators, and in power transmission coupling devices. There has been no showing, however, of a fluidically coupled rotation sensing control operable in conjunction with the drive system of a rotatable appliance to provide control of a movable member.

SUMMARY OF THE INVENTION

It is therefore an object of the instant invention to provide an improved rotation sensing control for a rotatable appliance.

It is a further object of the instant invention to provide a device for sensing rotary motion and for controlling movement of a movable member when motion is detected.

It is a still further object of the instant invention to provide a rotation sensing control which utilizes a fluidically coupled member for transferring sensed rotation to maintain a movable member in a predetermined posture.

Briefly, the instant invention achieves these objects in an apparatus including structure enclosing a rotatable member. The structure includes a movable member operable between a first closed posture and a second open posture for providing access to the rotatable member. Control mechanism is operable for controlling movement of the movable member between the first and second postures. A rotation sensing device is associated with the rotatable member and includes a first reaction surface rotatable with the rotatable member. A second reaction surface is juxtaposed to the first reaction surface in a fluid coupling relationship. A fluid reservoir is associated with the reaction surfaces and a fluid is retained in the reservoir to form a fluid coupling between the first and second reaction surfaces. The second reaction surface and the control mechanism are joined through interconnecting linkage. The second reaction surface is arcuately movable by the fluid coupling responsive to movement of the rotatable member to effect operation of the control mechanism for maintaining the movable member in the closed posture to prevent access to the movable member.

BRIEF DESCRIPTION OF THE DRAWINGS

The drawings illustrate a preferred embodiment of the invention with similar numerals referring to similar parts through the several views, wherein.

DESCRIPTION OF A PREFERRED EMBODIMENT

Figure 1:
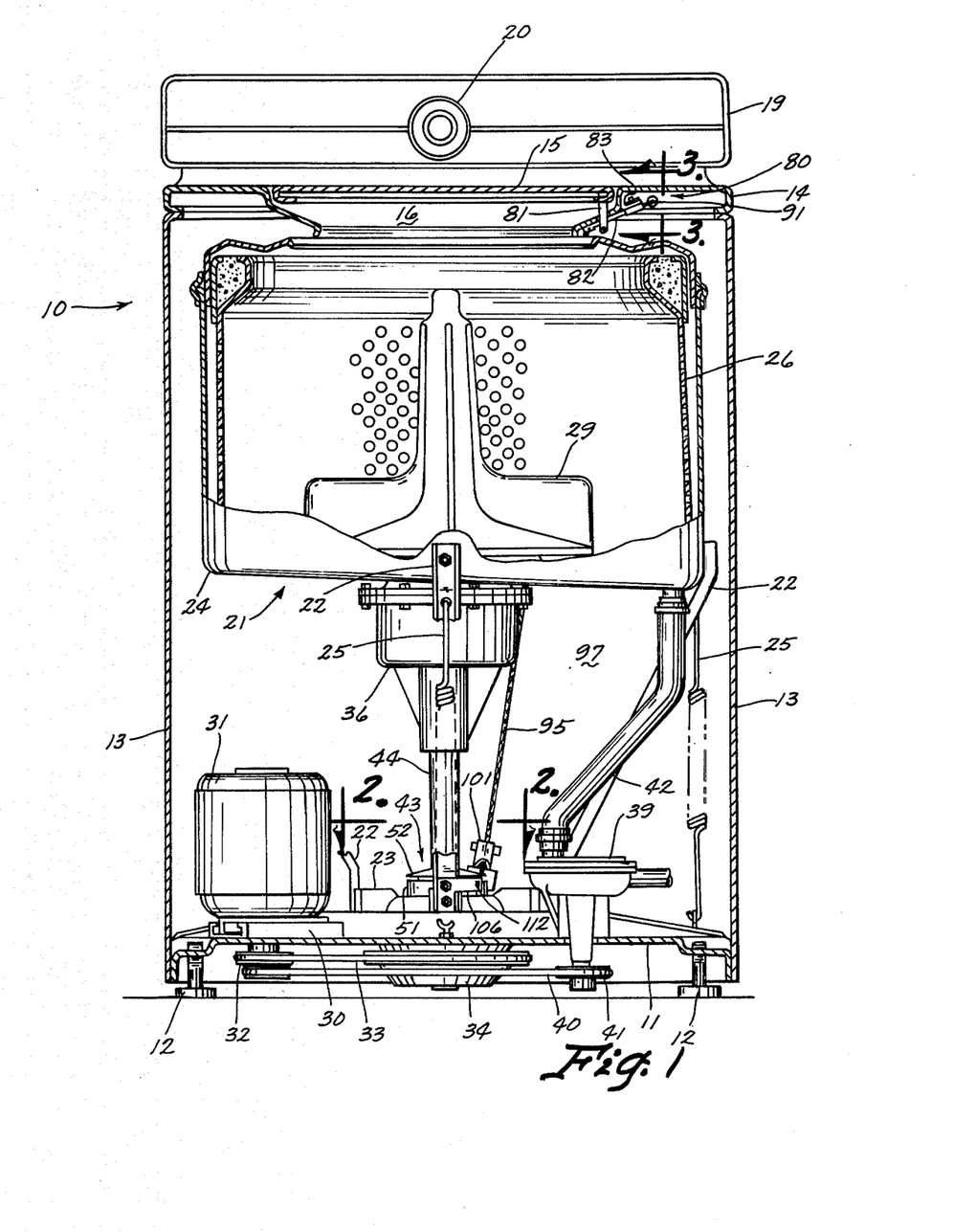
FIG. 1 is an overall view of an automatic fabric washing machine with various components broken away to show portions of the drive system and incorporating the instant invention.

Referring to FIG. 1 there is shown an automatic washing machine 10 including a base frame 11 supported on a plurality of adjustable legs 12 and mounting a cabinet comprising side walls 13 and a top cover 14. The top cover 14 includes a hinged panel comprising an access door or lid 15 normally covering a recessed loading opening 16 and movable to an open position to permit access to the opening 16. The top cover 14 further includes an upwardly extending housing 19 for accommodating various control members such as programming means actuatable by a dial 20.

Mounted within the cabinet is a tub assembly 21 nutationally supported on the base frame 11 by an inverted tripod arrangement including tub braces 22 which are connected at the lower end to a support member 23 positioned on the base frame 11. The tub braces 22 are connected at their upper ends to a generally imperforate outer liquid container or tub 24. The tub braces 22 are also resiliently connected to the base frame 11 by means of centering springs 25 which resist rotation of the support member 23 relative to the base frame 11 but permit nutational movement relative to the base frame 11.

Revolvably mounted in the imperforate outer tub 24 is a perforate clothes basket or fabric container 26 in which is positioned an oscillatable agitator 29 for effecting movement of the fabrics and washing fluid within the tub assembly 21. The imperforate outer tub 24 and the perforate inner fabric container 26 are substantially aligned with the loading opening 16 in the top cover 14 for permitting the operator to place articles within the fabric container 26 and remove them upon completion of the cycle.

The base frame 11 also supports through motor mount 30 a reversible drive motor 31 operable in a bidirectional drive system for selectively effecting oscillation of the agitator 29 or centrifugal rotation of the inner fabric container 26. The drive system for effecting operation of the agitator 29 and rotation of the fabric container 26 includes a double groove pulley 32 fixed to the shaft of the motor 31 and drivingly engaged with a main drive belt 33 which in turn is drivingly engaged with the main drive pulley 34. The main drive pulley 34 is drivingly connected to either the agitator 29 through a drive shaft 35, shown in FIGS. 2 and 5, and the gearing of a transmission 36 or to the fabric container 26 through the housing of the transmission 36 and a clutch (not shown). Operation of the motor 31 in a first direction effects rotation of the main drive pulley 34 for effecting oscillation of the agitator 29 through the drive shaft 35 and transmission 36 gearing while operation of the motor 31 in the opposite direction effects rotation of the main drive pulley 34 and the transmission 36 through the clutch (not shown) for rotating the fabric container 26 to effect centrifugal extraction of liquid.

The base frame 11 also supports a pump 39 driven by the bidirectional motor 31 through the motor mounted double groove pulley 32, the pump drive belt 40 and the pump mounted pulley 41. The pump 39 communicates with the outer tub 24 through the conduit 42 and is operable for pumping liquids from the outer tub 24 toward an external drain when the motor 31 is operated in the direction for effecting centrifugal rotation of the fabric container 26.

The washing machine 10 is provided with controls for programming the washing machine 10 through a sequence of operations including energization of the motor 31 for operation in a first direction to effect a washing and/or rinsing function followed by energization of the motor 31 in a second direction to effect a liquid extraction function.

The construction and mounting of the tub assembly 21 and the operation of the inner tub or fabric container 26 and agitator are more clearly and specifically shown in the following patents, each of which is assigned to the assignee of the instant invention: Scott et al, U.S. Pat. No. 2,854,297; Smith et al U.S. Pat. No. 2,926,136; Burkland, U.S. Pat. No. Re 25,157; and Goodlaxson, U.S. Pat. No. 3,013,645.

Figure 2:
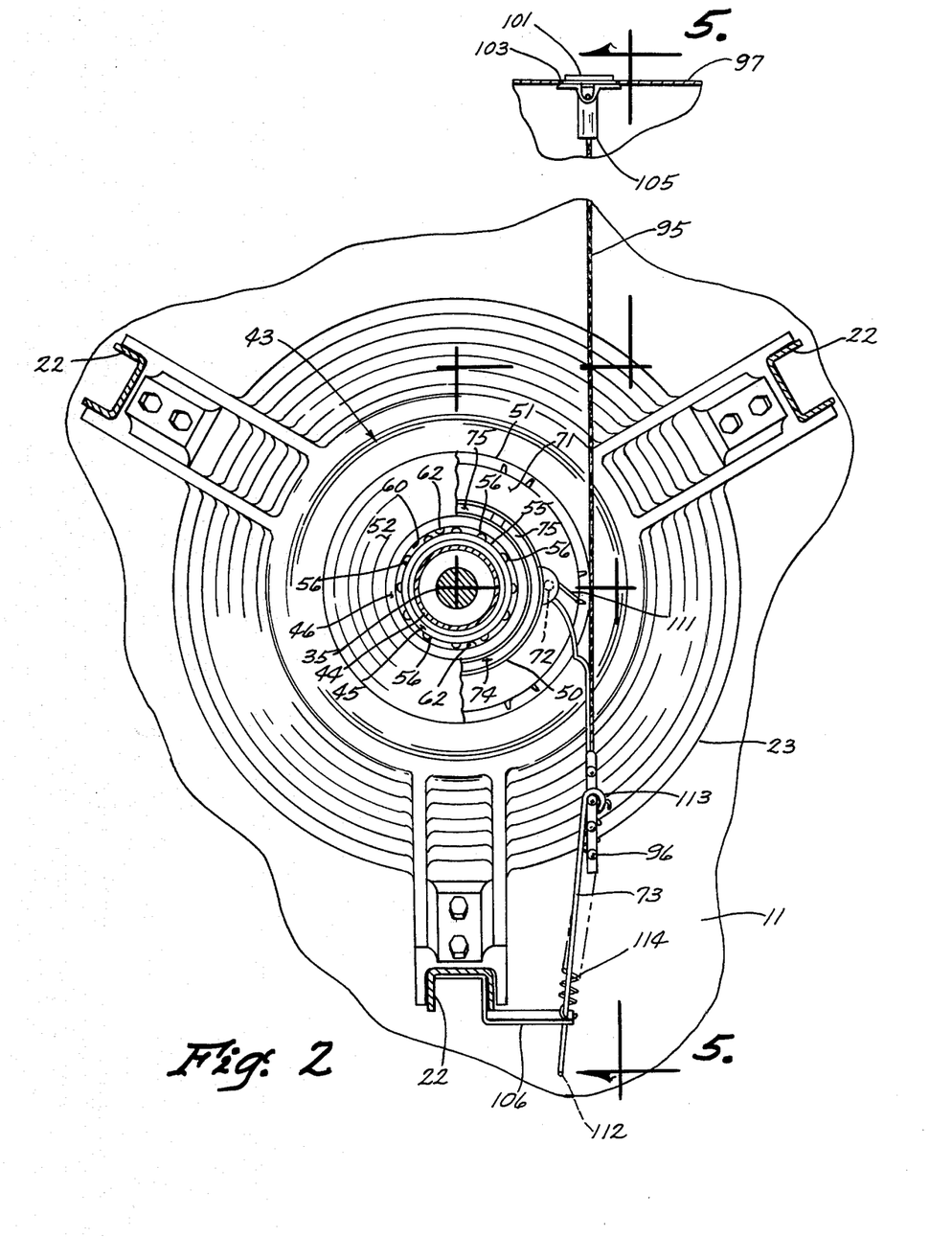
FIG. 2 is a fragmentary view of the rotation sensing device and connecting linkages as taken generally along lines 2—2 of FIG. 1.
Figure 5:
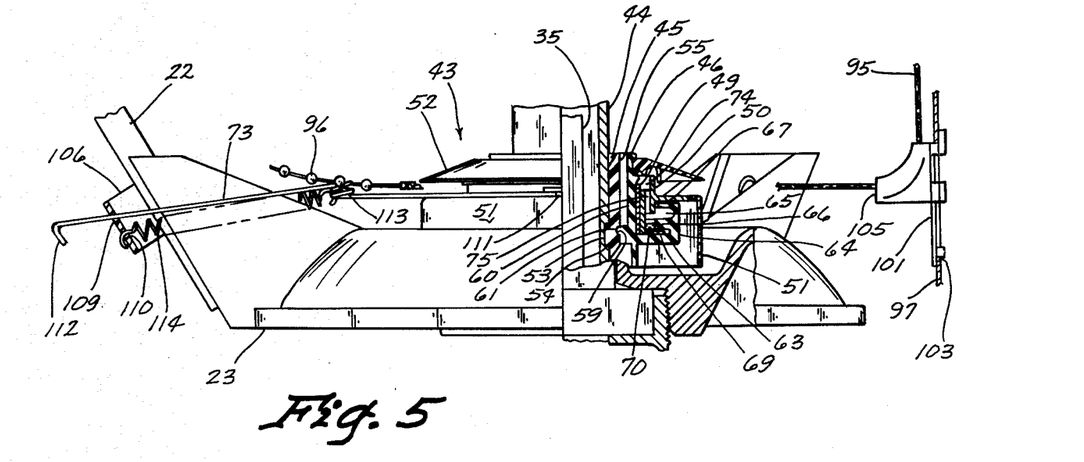
FIG. 5 is a fragmentary sectional view showing part of the rotation sensing device in cross section and taken generally along lines 5—5 of FIG. 2.
Figure 7:
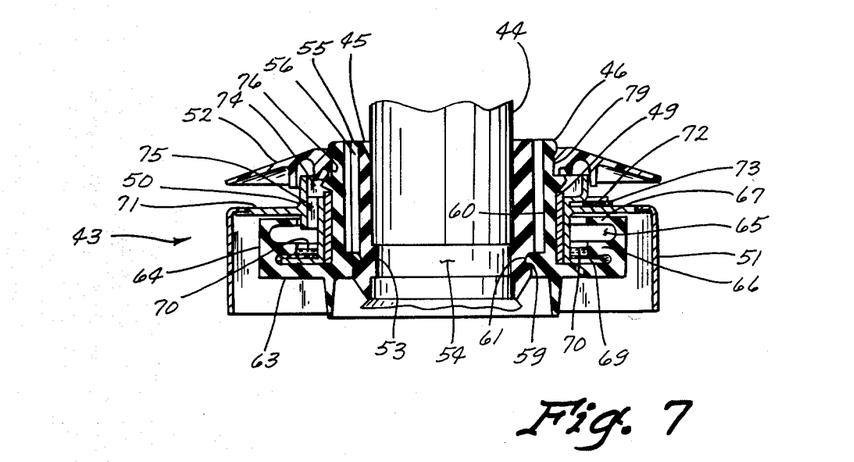
FIG. 7 is an enlarged view of the rotation sensing device in cross section and similar to a portion of FIG. 5.

Referring now to FIGS. 2. 5 and 7, there is shown a rotation sensing device 43 which is rotatively coupled to the outer or spin shaft 44 of the drive system. Thus, when the drive motor 31 is operated in the direction for rotating the fabric container 26 to effect centrifugal extraction of liquid, the rotation sensing device 43 will be rotated with the spin shaft 44 and transmission 36.

In this embodiment the rotation sensing device 43 is mounted on the spin shaft 44 just above the support member 23 and is made up of six major components: a mounting sleeve 45, a sensor body or housing 46, a bearing 49, a sensor spool or reel 50, a skirt 51, and a water shield 52. It is contemplated that the rotation sensing device 43 could be located at any convenient position on the spin shaft 44 either above or below the base frame 11 with certain locations being more desirable from a serviceability aspect.

As best shown in FIGS. 5 and 7, the mounting sleeve 45 is a generally cylindrical rubber member having an internal circumferential shoulder 53 which mates with a circumferential groove 54 on the spin shaft 44. The mating shoulder 53 and groove 54 combine with a slight interference fit between the inner diameter of the cylindrical mounting sleeve 45 and the outside diameter of the spin shaft 44 to secure the mounting sleeve 45 to the shaft 44. The outer wall 55 of the mounting sleeve 45 includes a plurality of spaced apart vertically extending ribs or splines 56.

The sensor body or housing 46 includes a circumferential radiused shoulder 59 at the lower portion of an inner cylinder 60 which is engageable with a circumferential groove 61 at the lower portion of the mounting sleeve 45. As best shown in FIG. 2, the upper portion of the inner cylinder 60 of the sensor body 46 includes at least two longitudinal ribs or splines 62 which cooperate with the ribs or splines 56 of the mounting sleeve 45 to effectively lock the sensor body 46 to the mounting sleeve 45 for rotation therewith.

A circular horizontal bottom wall or web section 63 extends radially outward from below the radiused shoulder 59 of the sensor body 46. The outer periphery of this bottom wall 63 projects upwardly forming a peripheral vertical wall 64 which in combination with the outside wall of the inner cylinder 60 of the sensor body 46 defines an upwardly opening fluid reservoir or confinement area 65 having a generally U-shaped cross sectional configuration. The vertical wall 64 further includes a pair of vertically spaced, horizontally inwardly extending circumferential lips 66 and 67 forming fluid catch rings within the reservoir of the sensor body. The lower catch ring 66 traps a small quantity of fluid between it and the bottom wall 63 of the sensor body 46 during spinning. The upper catch ring 67 prevents fluid from escaping the reservoir 65 when the washing machine 10 is tipped on its side or back for servicing.

As best shown in FIG. 7, a metal sleeve bearing 49 is frictionally attached to the outside wall of the inner cylinder 60 of the rubber sensor body 46. In this embodiment a sintered powdered iron material is used for the sleeve bearing 49. It is envisioned that other bearing materials could be utilized in this application such as a phosphor-bronze or possibly some thermoplastic materials.

A molded thermoplastic sensor spool or reel 50 is assembled over the sleeve bearing 49 with its inner diameter engageable with the outside diameter of the sleeve bearing 49 for rotation thereon. The bottom of the sensor spool or reel 50 includes a radially extending circumferential flange 69 as best shown in FIGS. 5 and 7. In the assembled posture this flange 69 extends radially outward between the circular bottom wall or web 63 and the lower catch ring 66 of the sensor body reservoir 65 and rotates in a quantity of silicone fluid 70 within the reservoir 65. The positioning of the bottom flange 69 between the bottom wall or web 63 and the lower catch ring 66 provides two fluid shear surfaces between the silicone fluid 70 and the bottom flange 69 during rotation. A first fluid shear surface is set up between the bottom of the flange 69 and the bottom wall 63 of the sensor body 46 with a second fluid shear surface between the underside of the lower catch ring 66 and the top of the flange 69.

The upper portion of the sensor spool or reel 50 includes a second radially extending circumferential flange 71 extending outwardly above the upper catch ring 67 of the sensor body 46. The outer periphery of the second flange 71 receives a downwardly extending cylindrical skirt 51 which surrounds at least the reservoir 65 of the sensor body 46 and in the case of an overflow situation of the tub 24 prevents washing fluid from entering the reservoir 65 of the sensor body 46 either by tracking down the side of the tub 24 or splashing up from the base frame 11 or the support member 23. As further shown in FIGS. 2 and 7, the upper or second flange 71 of the sensor spool 50 includes at least one peg 72 which extends upwardly from the top of the second flange 71 and is used for attaching the end of a wire movement limiting link 73 which will be further discussed herein.

As indicated in FIGS. 2, 5 and 7, the upper portion of the sensor spool or reel 50 is flared or belled to form a fluid accumulation area 74. This area traps fluid 70 which migrates upward between the inner diameter of the sensor spool 50 an the outer diameter of the bearing 49 as the machine 10 is spinning. The fluid 70 is returned to the reservoir 65 by way of a plurality of arcuate vertical channels 75 which extend downwardly from the accumulation area 74 toward the reservoir 65.

The entire rotation sensing device 43 is protected from water or other liquids which may leak down the spin shaft 44 from the tub 24 by a semi-conical water slinging shield 52. As best shown in FIG. 7, this shield has an internal circumferential shoulder 76 which is frictionally engageable with a circumferential groove 79 in the sensor body 46 and is rotatable therewith to sling any liquid away from the rotation sensing device 43.

Figure 3:
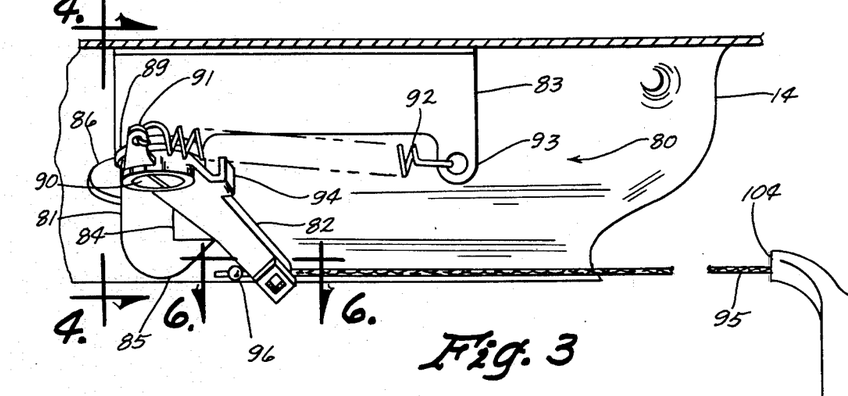
FIG. 3 is a fragmentary sectional view of the access door latching mechanism taken generally along lines 3—3 of FIG. 1.
Figure 4:
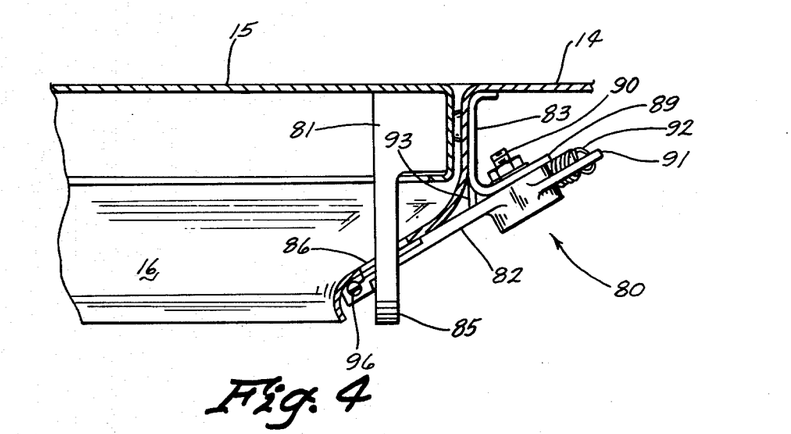
FIG. 4 is another fragmentary sectional view of the access door latching mechanism taken generally along lines 4—4 of FIG. 3.

Turning now to FIGS. 1, 3, 4 and 6 there is shown a lid or door latching assembly 80. As shown in FIGS. 3 and 4 especially, the lid or door latching assembly 80 includes a catch 81 secured to the underside of the access door 15 which is selectively engageable with a latch member 82. The latch member 82 is pivotally attached to a mounting bracket 83 which is secured to the underside of the top cover 14.

The access door mounted catch 81 is generally rectangular in shape and includes a notch 84 at one end which forms a hook 85 for engaging with the latch member 82. With the access door 15 in the closed posture, the hook 85 of the catch 81 extends through a slot 86 on one side of the recessed loading opening 16 as shown in FIGS. 3 and 4. When in this closed posture the hook 85 is juxtaposed to the latch member 82 and is ready for engagement therewith.

The latch member 82 is pivotally attached to an outwardly projecting tab portion 89 of the mounting bracket 83 by a shouldered screw 90 which allows free rotation of the latch member 82. The body of the latch member 82 extends angularly down from the attachment point generally parallel to the underside of the loading opening 16 and juxtaposed to the hook 85 of the door mounted catch 81. The body of the latch member 82 also extends in the opposite direction from the attachment point to form an ear 91 for attaching one end of a biasing spring 92. The biasing spring 92 extends from the ear 91 on the latch member 82 to an apertured projection 93 at the opposite end of the mounting bracket 83 and urges the latch member 82 toward the hook 85 of the catch 81.

The body of the latch member 82 which underlies the loading opening 16 and which is juxtaposed to the hook 85 of the catch 81 further includes an upwardly projecting leg 94. This leg 94, as shown in FIG. 3, is engageable with an edge of the mounting bracket tab 89 to limit travel of the latch member 82 toward the hook 85 of the catch 81.

The rotation sensing device 43 and the lid or door latching assembly 80 are operatively interconnected by a cable 95 which extends rearwardly from the lid latching assembly 80, down the rear wall 97 of the cabinet and forward to the rotation sensing device 43.

Figure 6:
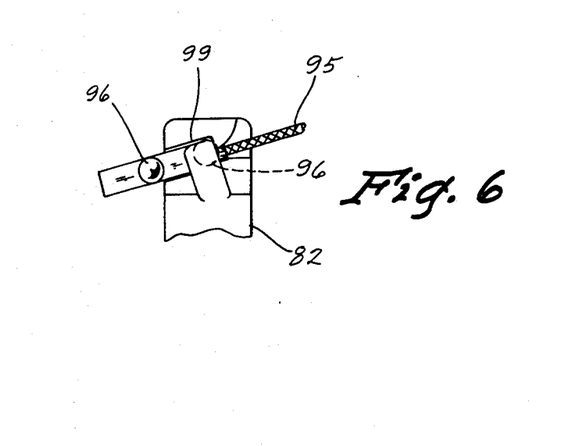
FIG. 6 is a partial view of the end portion of the door latch member as generally taken along lines 6—6 of FIG. 3.

The interconnecting cable 95 is formed by molding a plurality of thermoplastic beads 96 to each end of a braided dacron line. In this embodiment, the plastic beads 96 are molded of a polypropylene material and are 7/64 of an inch in diameter. The beads 96 are spaced ⅜ of an inch apart and have a 0.035 inch web of plastic between beads 96. The braided dacron line has been proven to be resistant to deterioration from bleach and detergents and provides a semiporous surface for adhesion of the thermoplastic beads 96. Braided cables formed from a 312 or 316 series stainless steel have also been found to be bleach and detergent resistant and usable in this application. FIG. 6 best shows the attachment of one end of the beaded cable 95 to an end of the latch member 82. The cable 95 is inserted into a slot 99 at the end of the latch member 82 and the bead 96 is then pulled into a molded pocket as shown in dashed lines to anchor the cable 95 to the latch member 82.

The cable 95 extends rearwardly from the end of the latch member 82 toward the rear wall 97 of the cabinet. At the rear wall 97 it engages with an upper cable guide 100 and is directed downwardly along the rear wall 97 of the cabinet toward a lower cable guide 101 and then forward toward the rotation sensing device 43.

The upper and lower cable guides 100 and 101 are molded of a thermoplastic material such as ACETAL or NYLON for their self-lubricating properties and resistance to dirt and dust accumulation. The cable guides 100 and 101 snap into substantially rectangular mounting holes 102 and 103 in the rear wall 97 of the cabinet. Each cable guide 100 or 101 includes an arcuate section 104 or 105 for turning the cable 95 through substantially a 90 degree angle.

Returning now to FIGS. 2 and 5, there is shown the interconnection of the cable 95 with the rotation sensing device 43. Secured to the support member 23 at the front support brace mounting position is a sheet metal bracket 106 which includes a pair of vertically spaced apart apertures 109 and 110. The aforementioned movement limiting link 73 extends from the upper aperture 109 toward one of the upwardly extending pegs 72 associated with the second flange 71 of the sensor spool 50. As best shown in FIG. 2, the movement limiting link 73 includes a hook end 111 which surrounds the peg 72 to form a connection with the sensor spool 50. The opposite end of the link 73 is free to slide, within limits, in the bracket aperture 109 toward and away from the sensor spool 50. The limiting factor being a downwardly turned arm 112 on the aperture end of the link 23 which will contact the bracket 106 after about ¾ inch of movement to effectively limit movement of the sensor spool 50.

At about its midpoint the movement limiting link 73 is turned through at least two substantially open coils 113. The lower beaded end of the cable 95 is effectively attached to the sensor spool 50 of the rotation sensing device 43 through the movement limiting link 73 at the coils 113 as shown in FIGS. 2 and 5. The plurality of spaced apart, molded plastic beads 96 provide for adjustment of the cable 95 as well as attachment to the movement limiting link 73. The cable 95 is inserted between one of the substantially open coils 113 such that one of the plastic beads 96 will engage between a pair of coils 113 and secure the cable 95.

Attached to one of the lower open coils 113 of the movement limiting link 73 is one end of a cable biasing spring 114. The opposite end of this cable biasing spring 114 is secured to the second aperture 110 in the mounting bracket 106. In the at-rest or inoperative posture the biasing force exerted by this cable biasing spring 114 is sufficient to overcome the latch member biasing spring 92 and will maintain the latch member 82 out of engagement with the catch 81.

Several problems were overcome in developing the rotation sensing device 43 as described herein. One of these problems was the determination of the viscosity and chemistry of the fluid 70 for coupling the sensor spool 50 to the sensor body 46 as the sensor body 46 is rotated. A fluid 70 having a low evaporation rate and a stable viscosity over the life of an automatic washing machine 10 which is approximately 20 years or 18,000 spin cycles was necessary. Also, the rubber compound used in the sensor body or housing 46 must be compatible with the fluid 70.

Through experimentation, a silicone fluid 70 of the generic grouping methyl-alkyl polysiloxanes such as "Dow Corning No. 230" or "General Electric SF 1080" was found to possess the desirable evaporation and viscosity characteristics. Through further experimentation it was determined that several ethylene propylene diene monomer and several NEOPRENE or other polychloroprene rubber compounds would work satisfactorily with the chosen silicon fluid 70. These rubber compounds must also be free of any waxes used for ozone resistance and must be free of stearic acid used for curing. The waxy ingredients were found to have a tendency to dissolve in the silicone fluid 70 and cause it to gel or harden. Any alteration of the silicone fluid characteristics such as gelling or hardening adversely affects operation of the device.

In this embodiment, 3.0 cubic centimeters of either "Dow Corning No. 230" or "General Electric SF 1080" silicone fluid 70 are used to fill the reservoir 65. Of this quantity of silicone fluid 70 approximately 0.7 cubic centimeters will become impregnated into the material of the sleeve bearing 49 with the remaining 2.3 cubic centimeters remaining in the reservoir 65.

While the described embodiment of the invention is based on the usage of a particular silicone fluid within a reservoir molded of ethylene propylene diene monomer rubber, the invention is not to be limited to the usage of these materials. It is contemplated that there are a number of material combinations which could be used in this application.

The operation of the rotation sensing device 43 in actuating the lid latching assembly 80 can best be understood by describing its operation in the centrifugal extraction cycle of the automatic washing machine 10. When the washing machine 10 enters the spin or centrifugal extraction portion of the cycle of operations the transmission 36 and the outer spin shaft 44 will be locked together though a clutch (not shown) and the spin shaft 44, transmission 36, and inner tub or fabric container 26 will be rotated in a counterclockwise direction as viewed in FIG. 2.

Rotation of the spin shaft 44 will effect simultaneous rotation of the mounting sleeve 45, sensor body 46 and bearing 49. The reservoir or confinement area 65 of the sensor body 46 is filled with silicone fluid 70 impregnated into the sleeve bearing 49 and occupying the area between the sleeve bearing 49 and the inside diameter of the sensor spool 50. Further, the lower flange 69 of the sensor spool 50 is surrounded by the silicone fluid 70. Thus, as the sensor body 46 and bearing 49 are rotated, a fluid shear connection or coupling is formed between the sensor spool 50 and the sensor body 46 and sleeve bearing 49.

As the spin shaft 44, sensor body 46 and sleeve bearing 49 rotate, the sensor spool 50 will be rotated through a predetermined arcuate distance due primarily to the viscous shear of the silicone fluid film between the bottom of the flange 69 and the bottom wall 63 of the sensor body 46 and between the top of the flange 69 and the underside of the lower catch ring 66. The shear effect of the fluid film between the surface of the bearing 49 and the inner diameter of the sensor spool 50 is minimal because of the clearance between the running surfaces. At start-up the pull on the movement limiting link 73 will be 3 to 4 pounds. After running for a short period of time the pull will level out at between 0.77 to 2.2 pounds. The arcuate distance traveled by the sensor spool 50 is limited by the down-turned arm 112 of the movement limiting link 73 as it makes contact with the mounting bracket 106. The arcuate movement of the sensor spool 50 pulls the movement limiting link 73 and overcomes the cable biasing spring 114 attached to the link 73. This enables the latch member biasing spring 92 to take up cable slack and move the latch member 82 toward engagement with the hook 85 of the catch 81. The engagement of the latch member 82 with the catch 81 will prevent the operator from opening the lid 15 during the extraction or high speed spin portion of the cycle of operations.

As the sensor body 46 and bearing 49 rotate, a fluid pumping action is set up between the contacting surfaces of the bearing 49 and the sensor spool 50. Silicone fluid 70 is pumped from the reservoir or confinement area 65 and into the accumulation area 74 at the top of the sensor spool 50. The silicone fluid 70 is returned to the reservoir 65 by gravity drainage through the plurality of arcuate vertical channels 75 molded into the sensor spool 50.

When the spin or extraction cycle has been completed the fluid shear connection or coupling effect between the sensor body 46 and sensor spool 50 will be discontinued and the system will be returned to the at-rest posture. In this posture the cable biasing spring 114 will overcome the latch biasing spring 92 to disengage the latch member 82 from the catch 81 which will allow opening of the access door 15.

It is contemplated that the method of interconnecting the rotation sensing device 43 and the lid latching assembly 80 as shown may be modified through the use of various equivalent linkages and/or structures to transfer the motion of the rotation sensing device 43 to the lid latching assembly 80 and provide for locking of the access door 15.

It is thus seen that the described rotation sensing device 43 provides an improved device for sensing rotary motion and for actuating a lid latching assembly 80 when such motion is sensed. The combination provides a unique which utilizes a fluid shear connection between contact surfaces to initiate movement to actuate a latch member 82.

In the drawings and specification there is set forth a preferred embodiment of the invention and though specific terms are employed these are used in a generic and descriptive sense only and not for purposes of limitation. Changes in the form and the proportion of parts as well as the substitution of equivalents are contemplated as circumstances may suggest or render expedient without departing from the spirit or scope of this invention as defined in the following claims.

I claim:

1. A rotation sensing control for use in an apparatus including structure enclosing a rotatable member and having a movable member operable between a first closed posture and a second open posture for providing access to said rotatable member, the combination comprising: control means operable for controlling movement of said movable member between said first and second postures; rotation sensing means associated with said rotatable member and including a driving member having a first fluid shear surface and rotatable with said rotatable member, a driven member supported for rotation relative to said driving member and defining a second fluid shear surface juxtaposed to said first fluid shear surface in a fluid coupling relationship, a fluid reservoir associated with one of said driving or driven members, and a fluid retained in said reservoir to form a fluid coupling between said first and second fluid shear surfaces; and means interconnecting said driven member and said control means, said driven member being arcuately movable by said fluid coupling responsive to movement of said rotatable member to effect operation of said control means for maintaining said movable member in said closed posture to prevent access to said rotatable member.

2. A rotation sensing control as defined in claim wherein said reservoir includes a wall member defining one of said fluid shear surfaces.

3. A rotation sensing control as defined in claim 1 wherein said driving member comprises a body portion rotatable with said rotatable member and defining said reservoir and said first fluid shear surface.

4. A rotation sensing control as defined in claim 1 wherein said means interconnecting includes a movement limiting link for interconnecting said apparatus and said second fluid shear surface to limit said movement of said second fluid shear surface.

5. A rotation sensing control as defined in claim 4 wherein said means interconnecting further includes an adjustable cable between said movement limiting link and said control means.

6. A rotation sensing control for use in an apparatus including structure enclosing a rotatable member and having a movable member operable between a first closed posture and a second open posture for providing access to the rotatable member, the combination comprising: control means operable for controlling movement of said movable member between said first and second postures; rotation sensing means operably associated with said rotatable member and including a body portion defining a fluid retaining reservoir, a spool portion journaled to said body portion for rotation relative thereto, and a quantity of fluid retained in said reservoir forming a fluid shear coupling between said body and spool portions; and means interconnecting said spool portion and said control means, said spool portion being arcuately rotatable by said fluid shear coupling responsive to movement of said rotatable member to effect operation of said control means for maintaining said movable member in said closed posture to prevent access to said rotatable member.

7. A rotation sensing control as defined in claim 6 wherein said means interconnecting includes a movement limiting link interconnecting said apparatus and said spool portion for limiting rotation of said spool portion to a predetermined arcuate distance.

8. A rotation sensing control as defined in claim 6 wherein said spool portion includes a fluid accumulation area spaced from said fluid retaining reservoir for receiving fluid which is pumped upwardly through the journaled connection between said body portion and said spool portion with said fluid accumulation area and said fluid retaining reservoir being interconnected by a plurality of generally vertical slotted channels for returning said fluid to said fluid retaining reservoir.

9. A rotation sensing control as defined in claim 6 wherein said body portion includes a generally vertically extending peripheral wall forming the outer boundary of said fluid retaining reservoir.

10. A rotation sensing control as defined in claim 9 wherein said spool portion includes a radially extending lower flange and said peripheral wall includes at least one inwardly extending generally horizontal lip defining a catch ring for retaining said fluid and for providing a fluid shear surface relative to said lower flange of said spool portion.

11. A rotation sensing control as defined in claim 6 wherein said control means includes biasing means for maintaining said control means out of engagement with said movable member when said rotatable member is in a non-rotating condition to allow access to said rotatable member.

12. A rotation sensing control for use in an apparatus including a rotatable member, the combination comprising: a movable control member operable between first and second postures to effect a control function; rotation sensing means associated with said rotatable member and including a body portion rotatable with said rotatable member and defining a fluid retaining reservoir having a bottom wall and an outer peripheral wall with at least one inwardly extending generally horizontal lip, a spool portion journaled on said body portion and including a lower flange between the bottom wall of said reservoir and said horizontal lip, and a fluid retained in said reservoir to form a coupling between surfaces of said spool lower flange and mating surfaces of the bottom wall of said reservoir and said horizontal lip; and means interconnecting said spool portion and said movable control member, said spool portion being arcuately rotatable by said fluid coupling responsive to rotation of said rotatable member and said body portion for effecting actuation of said means interconnecting to move said movable control member between said first and second postures.

13. A rotation sensing control as defined in claim 12 wherein said rotation sensing means includes a sleeve bearing associated with said body portion and on which said spool portion is journaled.

14. A rotation sensing control for use in a fabric washing apparatus including cabinet structure enclosing a rotatable member and having an access door movable between a generally closed position and a generally open position, the combination comprising: latch means operable between said cabinet and said access door to selectively latch said access door in said closed position; rotation sensing means operably associated with said rotatable member and including a body portion defining a fluid retaining reservoir, a spool portion journaled to said body portion for rotation relative thereto, and a quantity of fluid retained in said reservoir forming a fluid shear coupling between said body and spool portions; and interconnecting linkage between said spool portion and said latch means, said spool portion being rotatable through a predetermined arcuate distance by said fluid shear coupling responsive to rotation of said rotatable member to effect operation of said latch means through said interconnecting linkage for latching said access door in said closed position.

15. A rotation sensing control as defined in claim 14 wherein said interconnecting linkage includes biasing means for maintaining said latch means out of latching engagement with said access door when said rotatable member is in a non-rotating condition.

16. A rotation sensing control as defined in claim 14 wherein said fluid retained in said reservoir is a silicone fluid of the methyl-alkyl polysiloxane group.

17. A rotation sensing control for a fabric washing apparatus including a cabinet generally enclosing a rotatable member and having an access door operable between open and closed positions, the combination comprising: latch means operable between said cabinet and said access door to selectively latch said access door in said closed position; drive means including a shaft coupled to said rotatable member and operable for effecting rotation thereof; rotation sensing means mounted on said shaft and including a body portion having an inner cylindrical member mounted on said shaft for rotation therewith and an upwardly opening fluid retaining reservoir defined by a generally vertically extending peripheral wall and a substantially horizontal web section interconnecting the lower portions of said peripheral wall and said inner cylindrical member, a sleeve-like bearing member associated with the outside diameter of said inner cylindrical member, a sensor spool having a cylindrical central portion interconnecting lower and upper radially extending generally horizontal flanges with said lower flange rotatable within said fluid retaining reservoir, and a quantity of silicone fluid retained in said reservoir to form a fluid shear coupling between said sensor spool and said bearing member and body portion through the shear action of said silicone fluid between said sensor spool lower flange and said body portion as said shaft is rotated; a movement limiting link for limiting the arcuate rotation of said sensor spool relative to rotation of said body portion; and means interconnecting said movement limiting link and said latch means and movable responsive to the arcuate rotation of said sensor spool to effect the latching of said access door.

18. A rotation sensing control as defined in claim 17 wherein said means interconnecting includes an adjustable cable between said movement limiting link and said latch means.

19. A rotation sensing control as defined in claim 17 and further including biasing means for holding said latch means out of engagement with said access door when said rotatable member is stationary.

20. A rotation sensing control as defined in claim 17 wherein said peripheral wall includes at least one inwardly extending generally horizontal lip spaced from the lower flange of said sensor spool and interacting therewith in a fluid shear relationship.

21. A rotation sensing control for use in an apparatus including structure enclosing a rotatable member and having a movable member operable between a first closed posture and a second open posture for providing access to said rotatable member, the combination comprising: control means operable for controlling movement of said movable member between said first and second postures; rotation sensing means associated with said rotatable member and including a first reaction surface rotatable with said rotatable member, a second reaction surface juxtaposed to said first reaction surface in a fluid coupling relationship, a fluid reservoir associated with said reaction surfaces, and a fluid retained in said reservoir to form a fluid coupling between said first and second reaction surfaces; and means interconnecting said second reaction surface and said control means, said means interconnecting including a movement limiting link for interconnecting said apparatus and said second reaction surface to limit said movement of said second reaction surface and further includes an adjustable cable between said movement limiting link and said control means, said second reaction surface being arcuately movable by said fluid coupling responsive to movement of said rotatable member to effect operation of said control means for maintaining said movable member in said closed posture to prevent access to said rotatable member.

22. A rotation sensing control for use in an apparatus including a rotatable member, the combination comprising: a movable control member operable between first and second postures for providing a control function; rotation sensing means associated with said rotatable member and including a driving member having a first fluid shear surface and rotatable with said rotatable member, a driven member defining a second fluid shear surface juxtaposed to said first fluid shear surface in a fluid coupling relationship, a fluid reservoir associated with one of said driving and driven members, and a fluid retained in said reservoir to form a fluid coupling between said first and second fluid shear surfaces; and means interconnecting said driven member and said control member, said driven member being movable by said fluid coupling responsive to movement of said rotatable member to effect movement of said control member.

* * * * *